June 20, 1950     C. J. JOHNSON     2,512,334
HAND ACTUATED PRUNING SHEARS
Filed May 5, 1947
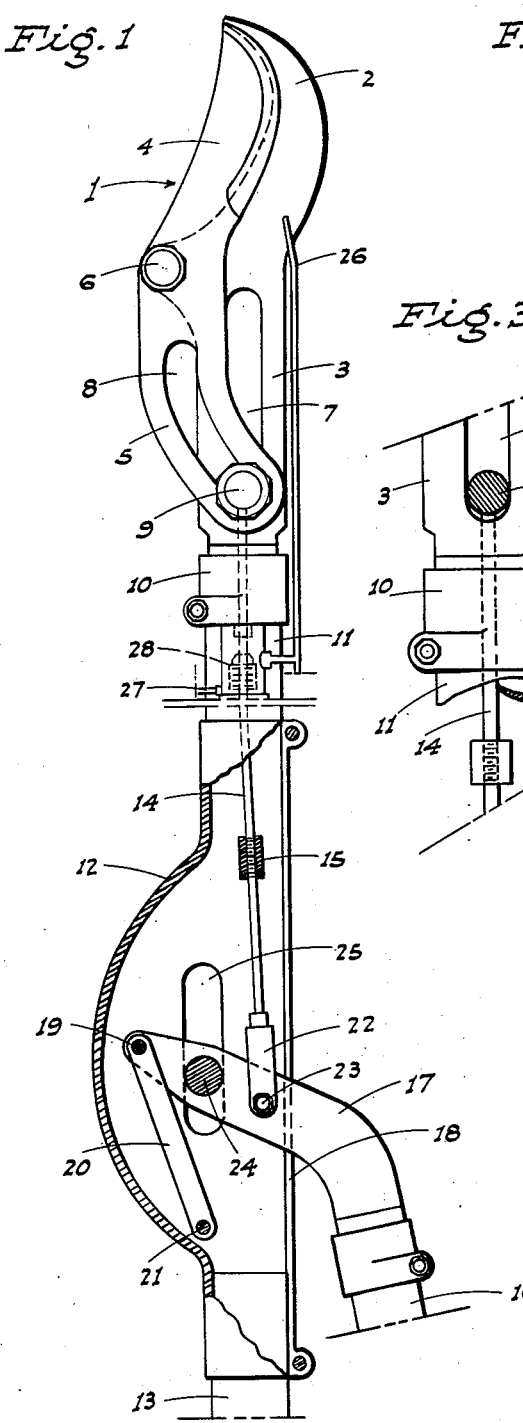
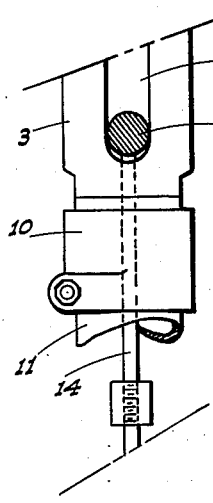
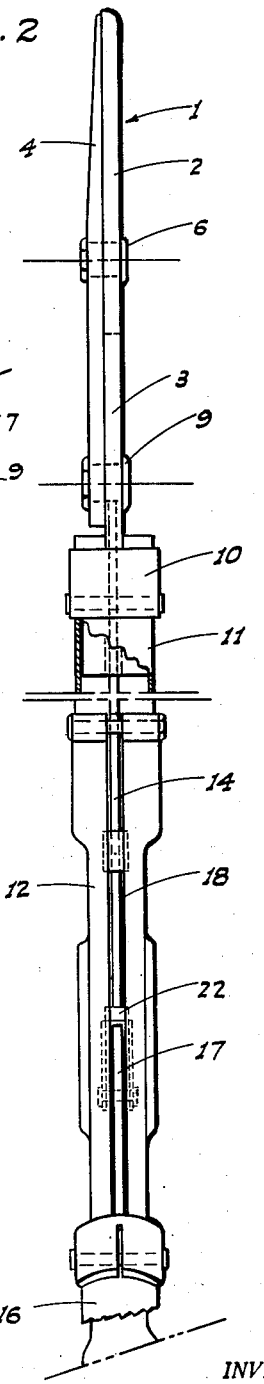
INVENTOR.
C. J. Johnson
BY
ATTYS

Patented June 20, 1950

2,512,334

UNITED STATES PATENT OFFICE 2,512,334

HAND ACTUATED PRUNING SHEARS

Charles J. Johnson, Sacramento, Calif.

Application May 5, 1947, Serial No. 746,063

2 Claims. (Cl. 30—251)

This invention is directed to improved pruning shears, and particularly comprises a modification of the shears shown in co-pending application, Serial No. 694,584, filed September 3, 1946, the shears being of pole type.

One object of the present invention is to provide pruning shears having the effective shear blade assembly of the identified copending application, but actuated manually rather than with power means as shown in said application. Where suitable power, such as fluid pressure, is not available or economical for use, it is desirable that the shears be manually actuated, as the instant invention contemplates.

Another object of the invention is to provide, in the shears, a novel manually actuated mechanism for operating the shear blade assembly.

A further object of the invention is to provide a simple, practical, and convenient hand-actuated pruning shears, and one which will be exceedingly effective for the purpose for which it is designed.

These objects are accomplished by means of such structure and relative arrangement of parts as will fully appear by a perusal of the following specification and claims.

In the drawings:

Fig. 1 is a broken side elevation of the shears, partly in section.

Fig. 2 is a broken elevation taken edgewise of the shears.

Fig. 3 is an enlarged, fragmentary sectional elevation illustrating the connection of the pull rod with the cross bolt of the shear assembly.

Referring now more particularly to the characters of reference on the drawings, this modified form of pruning shears includes a shear blade assembly, indicated generally at 1, of much the same construction and function as shown in the above identified co-pending application. Such shear blade assembly includes a fixed blade 2 having a straight rigid shank 3 depending therefrom, and a movable blade 4 having an arcuate swinging shank 5 depending therefrom; said blades 2 and 4 being pivoted together, as at 6, for swinging of the arcuate shank 5 across the straight fixed shank 3 to cause opening and closing movement of the blades 2 and 4.

The rigid shank 3 is longitudinally and straight slotted, as at 7, while the swinging shank 5 is arcuately slotted, as at 8. A cross bolt 9 extends through the slots 7 and 8, and, as is evident, shifting of such cross bolt 9 lengthwise of the device in one direction or the other will cause opening or closing of the blades 2 and 4.

At its inner end the straight rigid shank 3 is fixed to a clamping collar 10, which is in turn secured to the outer end of a relatively long tubular pole 11. The inner end of the tubular pole 11 is clampingly engaged by the outer end of a hollow elongated housing 12. At its opposite end the housing 12 is clamped to a fixed handle 13.

A pull rod 14 is fixed to the cross bolt 9 and extends through the clamping collar 10 in suitably guided relation, and thence passes through the pole 11 into the hollow elongated housing 12; there being a dielectric sleeve 15 interposed in said pull rod for safety to the operator should the shears engage a live wire. The pole 11 is also insulated from the shear blade assembly in any suitable manner.

The shears include another and movable handle 16 disposed alongside the fixed handle 13 in normally rearward divergent relation; there being a somewhat L-shaped lever 17 on the forward end of the movable handle 16. The lever 17 extends through a longitudinal slot 18 in the adjacent side of the hollow elongated housing 12, and within said housing the adjacent end of the lever is pivoted, as at 19, to the forward end of a generally longitudinally extending link 20 pivoted, at its rear end, as at 21, within said housing for lateral suitable manner.

The adjacent end of the pull rod is fitted with a clevis 22 straddling the lever 17, intermediate its ends and within the housing 12, and pivoted to said lever, as at 23.

To assure of generally straight-line motion of the pull rod 14 upon swinging of the movable handle 16 and lever 17, the latter carries a cross pin 24 which runs at opposite end portions in longitudinal slots 25 in opposite sides of the housing 12; said slots being parallel to the longitudinal axis of the tool.

When the above described pruning shears are in operation, the handles 16 and 13 are grasped by the hands of the operator, and the handle 16 actuated either outwardly or inwardly relative to the handle 13. When this occurs the resulting swinging motion of the lever 17 is transmitted through the pull rod 14 to the cross bolt 9, either advancing or retracting the same to open or close the shears, respectively.

The shears also include a conduit 26 positioned to discharge a quantity of disinfectant onto the cut each time the shears are operated; the conduit being adapted to receive the disinfectant from a supply conduit 27 coupled to a source of fluid under pressure. A valve unit, indicated generally at 28, housed within the pole 11, is interposed between the supply conduit 27 and conduit 26, being actuated by the pull rod 14 in a manner such that each time the shears are operated, the valve unit 28 opens momentarily.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the following claims.

Having thus described the invention, the following is claimed as new and useful and upon which Letters Patent is desired.

1. Manually actuated pruning shears comprising a tubular pole, a shear blade assembly mounted on the outer end of the pole, said shear blade assembly including a longitudinally movable shear actuating element, a pull rod connected to said element and extending through the tubular pole, a handle assembly mounted on the inner end of the pole, said handle assembly including a hollow longitudinal housing, a fixed handle projecting rearwardly from the housing, a laterally swingable handle alongside the fixed handle, a lever on said latter handle and projecting into said housing, a longitudinal link in the housing pivoted at one end to the latter for lateral swinging, the lever being pivoted to the free end of said link within the housing, a cross pin on and extending from the lever within the housing, the latter being slotted lengthwise for guiding reception of said pin and means attaching the pull rod to the lever on the side of the pin opposite that to which the link is connected.

2. Pruning shears comprising a pole, a handle on one end of the pole, a cutting blade having a shank, the blade and shank projecting in substantially longitudinal alinement with the pole and beyond the other end thereof, the shank being provided with a longitudinally extending slot, a cross bolt mounted in the slot for sliding movement therein, another blade pivoted in connection with the first blade, a shank on the second blade mounted to swing diagonally across the shank on the first blade, said second named shank having a slot therein, the bolt passing through the last named slot, the pole being provided with a longitudinally disposed slot adjacent the handle end thereof, such pole slot lying in substantial parallelism with the slot in the first named shank, a pin slidable in the pole slot, a second handle having a substantially L-shaped lever on one end, the lever being pivoted adjacent but short of one end thereof about the pin in the pole slot, a link pivoted to the pole and to the free end of the lever which projects beyond the pin, and a rod pivoted to the lever on the opposite side of the pin, said rod being connected at its opposite end to said bolt.

CHARLES J. JOHNSON.

REFERENCES CITED

The following references are of record in the file of this patent:

UNITED STATES PATENTS

| Number | Name | Date |
| --- | --- | --- |
| 720,706 | Lamb | Feb. 17, 1903 |
| 1,082,290 | Spencer | Dec. 23, 1913 |
| 1,476,049 | Bush | Dec. 4, 1923 |